June 10, 1941.  I. E. MUSKAT ET AL  2,245,077
METHOD OF CHLORINATING TITANIUM BEARING MATERIALS
Filed May 4, 1940
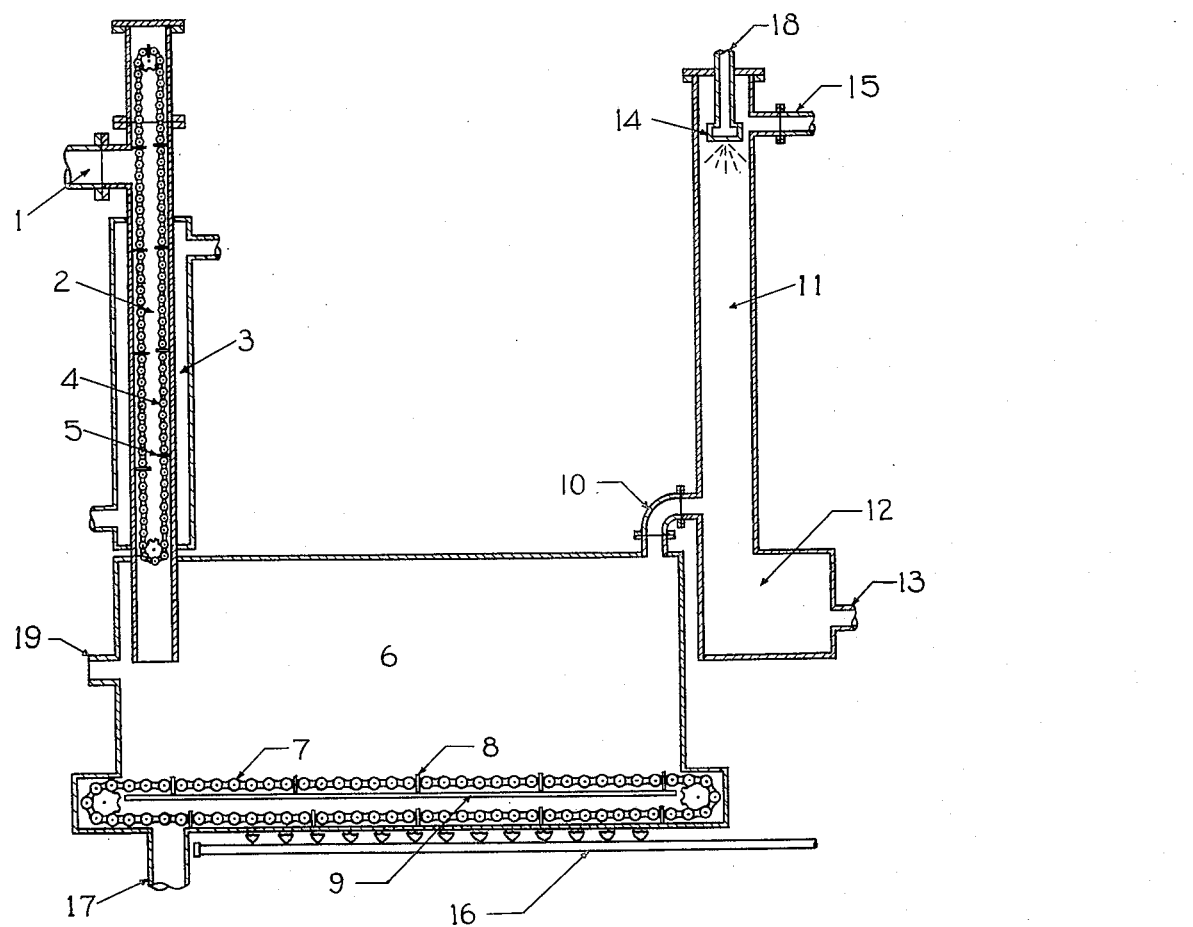
INVENTOR.
IRVING E. MUSKAT
& ROBERT H. TAYLOR
BY Raymond S Chisholm
ATTORNEY.

Patented June 10, 1941

2,245,077

UNITED STATES PATENT OFFICE 2,245,077

METHOD OF CHLORINATING TITANIUM BEARING MATERIALS

Irving E. Muskat and Robert H. Taylor, Akron, Ohio, assignors to Pittsburgh Plate Glass Company, Allegheny County, Pa., a corporation of Pennsylvania Application May 4, 1940, Serial No. 333,361

18 Claims. (Cl. 75—111)

This invention relates to the chlorination of ores containing iron and titanium and to the recovery of the chlorides of these metals. The chlorination of such materials may be conducted in a manner such that a mixture of iron and titanium chlorides are formed and volatilized. Prior to applicants' invention, attempts were made to separate and recover the two chlorides by means of fractional condensation. These processes have been found to be unsuccessful since plugging of the condenser system occurs within a short time after the process has been initiated.

In accordance with our invention, we have provided a method of recovering the iron and titanium chlorides without the plugging difficulties which have been encountered in prior art processes. The invention is particularly applicable to the treatment of vapors produced by the chlorination process described in our Patent No. 2,184,887.

In accordance with this process, we have found that the chlorination may be conducted without recourse to an externally heated reactor and that plugging may be substantially eliminated. The process is adapted to the treatment of titanium bearing materials containing from 10 to 50 percent or more of titanium and up to 50 percent of iron and is particularly adapted to the treatment of titanium bearing ores such as ilmenite which contain 20 to 50 percent of titanium and 10 to 40 percent of iron. Other ores such as titanomagnetite or other titanium iron bearing materials such as ferrotitanium, etc., may also be chlorinated.

The chlorination may be conducted in the presence of the required amount of a reducing agent such as carbon, if desired, in a suitable furnace with the consequent production of vapors of iron chloride and titanium tetrachloride. These vapors may be condensed and the chlorides therein separated as hereinafter described. We have found that if the chlorination is conducted at a temperature not less than 600° C. and preferably above 700° C., the reaction proceeds with such rapidity that the heat evolved by the reaction is sufficient to maintain reaction temperature without externally heating the reactor. Thus, by regulating the rate of introduction of ore, carbon and chlorine into the reactor, it is possible to maintain the temperature therein. This is not possible when the chlorination temperature is below 600° C. In order to achieve optimum efficiency and yield, the temperature should be maintained above 700° C., maximum efficiency being secured at 850–1250° C. Thus, when an ore such as ilmenite is chlorinated at a temperature of about 700° C., or above, the temperature of reaction may be maintained through careful periodical observation of temperature and regulation of the rate of introduction of chlorine, ore and carbon. In such a case, it is found possible to secure a good utilization of the chlorine introduced and to secure chlorination of the major portion of the ore without difficulty. When the temperature is maintained at 850–1250° C., maintenance of temperature within the reactor is considerably easier and less adjustment of the rate of addition of ore, carbon and chlorine is required. In addition, the chlorine utilization under such conditions generally exceeds 90 percent and in excess of 80 percent of the ore is generally chlorinated.

In the treatment of ores such as ilmenite, it is found that the required concentration of reducing agent is rather critical. In general, carbon concentrations below 15 percent by weight of the ore are insufficient to insure complete chlorination of the iron and titanium components. On the other hand, excess carbon concentrations are found to be objectionable since the presence of the excess makes temperature maintenance difficult. For most purposes, the carbon concentration should be maintained at 15–35 percent by weight of the ore. We have found that within limits the amount of titanium volatilized is proportional to the amount of carbon present. Thus, when an ilmenite ore containing 35.2 percent of titanium and 25.8 percent of iron is mixed with 2 to 6 percent of carbon and chlorinated at high temperatures, for example, above 850° C., substantially all of the iron is volatilized as iron chloride leaving the titanium in the form of an oxide in the residue. As the carbon concentration is increased, more and more titanium may be volatilized as the tetrachloride by chlorination and when the carbon concentration is 15 to 35 percent of the ore, in excess of 80 percent of the ore is completely chlorinated. Further increases in carbon concentration do not appear to increase the efficiency of the reaction but on the contrary, exert a quenching effect upon the reaction, thus making temperature maintenance very difficult. This may be compensated for to a degree by introduction of air or oxygen with the chlorine into the furnace in order to burn the excess carbon with consequent evolution of heat.

The vapors thus produced comprise a mixture of iron and titanium chlorides, wherein the iron chloride concentration generally exceeds 20 percent by weight of the weight of titanium tetrachloride in the vapors.

In general, it is difficult to secure satisfactory separation of the iron chloride by fractionally condensing iron and titanium tetrachloride since iron chloride often distributes itself throughout the condenser system, plugging the system to such an extent that it must be cleaned at frequent intervals. In order to avoid this plugging, it is advisable to condense the major portion of the iron chloride shortly after it is withdrawn from the furnace. To insure the removal of iron chlorides to such an extent that the possibility of plugging during subsequent condensation processes is minimized, it is found desirable to condense out all or a portion, generally not less than about 15–30 percent of the titanium tetrachloride together with the iron chloride. Any residual titanium tetrachloride vapor may then be condensed without fear of plugging the condenser system.

We have found that when a fractional condensation of iron chloride is attempted, a large portion of the iron chloride remains dispersed in the uncondensed gases in the form of a finely divided smoke or solid suspension. When a substantial portion of titanium tetrachloride is condensed with the ferric chloride, however, the condensed liquid tetrachloride bathes the gases and assists separation of the solid ferric chloride therefrom. The mixture of chlorides so condensed may then be heated to recover the titanium tetrachloride. In order to improve the separation of iron and titanium chlorides, it is desirable to heat the condensed mixture in the presence of a gaseous diluent. The gaseous mixture which remains after condensation of iron chloride and part of the titanium tetrachloride is found to be particularly suitable for a diluent since it is substantially free from oxygen or other agents which would promote decomposition of the chlorides.

This process is particularly applicable to the treatment of vapors containing a large amount of iron chloride whereby when iron and ttanum chlorides are condensed, a condensate which is solid or at least in the form of a thick fluid mush is obtained. This mixture thus obtained contains a substantial quantity of iron chloride, the concentration generally being in excess of 20 percent by weight of the total mixture. Since such mixtures ordinarily cannot be filtered, the titanium tetrachloride is generally removed by heating the mixture to revaporize the titanium tetrachloride. To insure efficient vaporization of the tetrachloride, this treatment preferably should be conducted by heating the chlorides to a temperature of 100–250° C. in the presence of a gaseous diluent such as nitrogen, chlorine, carbon dioxide, etc., in order to increase the volatility of the titanium tetrachloride. This process has been conducted most efficiently by transferring the condensed mixture of chlorides by scrapers or other suitable means to another portion of the condenser system and vaporizing the tetrachloride in the mixture in the presence of the mixture of gases which may contain chlorine, carbon dioxide, and vaporized titanium tetrachloride from which condensed chlorides were obtained initially. This may be done, for example, by preliminarily heating this gaseous mixture and contacting the condensed mixture of chlorides with the heated gases.

The accompanying drawing diagrammatically illustrates a suitable apparatus for conducting the process in accordance with our invention. The apparatus comprises a pair of condensers 2 and 11, which may be air cooled or may be cooled by water as will be understood in the art. In the normal operation of this device, ore or other titanium bearing material is chlorinated in a suitable furnace such as shown in our Patent No. 2,184,887, or other suitable furnace and vapors of iron and titanium chloride are formed. These vapors are introduced through inlet conduit 1, into condenser 2, which is provided with a water jacket 3, where they are cooled to a temperature sufficiently low, for example, below 40° C., whereby the major portion of the iron chloride and a large quantity of titanium tetrachloride are condensed and collected as a slush in chamber 6, at the base of condenser 1. Clogging of the condenser is prevented by means of a traveling chain 4, upon which are mounted scrapers 5. The chlorides are conveyed by these scrapers or by gravity to chamber 6, being discharged upon a floor 9. This condensate is then conveyed along the floor by means of scrapers 8, which are mounted upon a traveling chain 7, and are thus moved toward the end of the chamber. The chamber is heated by a suitable means 16, to the temperature required to permit vaporization of titanium tetrachloride, for example, 100 to 250° C. This vaporization is assisted by contact of the diluent gases escaping from the bottom of condenser 2, which pass over the condensate.

The ferric chloride, after vaporization of titanium tetrachloride, is discharged to the bottom of chamber 6, and finally is conveyed to a ferric chloride outlet 17, by scrapers 8. The vapors passing from chamber 6 enter titanium tetrachloride spray condenser 11, through conduit 10, where they are sprayed with a liquid halide such as titanium tetrachloride which is supplied to sprayhead 14, through supply line 18. The vapors are thus washed to remove suspended iron chloride and a portion or all of the titanium tetrachloride is condensed and collected in reservoir 12. The exhaust gases are removed through outlet 15, and may be subjected to further condensing operations for recovery of uncondensed titanium tetrachloride. Titanium tetrachloride may be withdrawn periodically through outlet 13. In order to assist in the revaporization of titanium tetrachloride, a gaseous diluent such as carbon dioxide, nitrogen, etc. may be introduced through inlet 19, into chamber 6. If desired, the gases passing through chamber 6 may be sprayed with a liquid halide such as titanium, carbon or silicon tetrachloride, by means of suitable sprays (not shown) in order to insure complete removal of the iron chloride from the system. This liquid may be revaporized with the previously condensed titanium tetrachloride and recovered in subsequent operations.

The following example illustrates the invention as applied to ilmenite ore. Other iron titanium ores may be treated in similar manner.

*Example.*—Using a shaft furnace having an internal diameter of 15 inches which was preheated to a temperature of 1000° C., briquettes prepared from a mixture corresponding to 100 parts ore to 23 parts C to 14 parts molasses were introduced at a rate of 120 pounds per hour and chlorine at 2.0 to 2.5 pounds per minute. The temperature remained at 850–1000° C. throughout the run without externally heating the furnace. The vapors were withdrawn from the furnace and cooled to 40° C. whereupon substantially all of the ferric chloride and 25 per cent of the titanium tetrachloride were simultaneously condensed. The condensed chlorides were transferred to another portion of the condenser where the titanium tetrachloride was revolatilized by heating while passing the exhaust gases of the furnace over the condensed chlorides. No plugging of the condenser system occurred during the run. The process was carried on continuously for many hours by introducing briquettes at a rate of 120 pounds per hour and chlorine at a rate of 2.0 to 2.5 pounds per minute. The treated residue was withdrawn at a rate required to keep the ore in the furnace at a constant level.

Although the present invention has been described with reference to specific details of certain embodiments thereof, it is not intended that such details shall be regarded as limitations upon the scope of the invention except insofar as included in the accompanying claims. This application is a continuation-in-part of our copending applications Serial Nos. 205,323, filed April 30, 1938, and 282,199, filed June 30, 1939.

We claim:

1. In the chlorination of a titanium bearing material which contains a quantity of iron of such magnitude that upon chlorination of said material, the amount of iron chloride formed is such as to cause plugging of the condenser system and at least 10 percent of titanium, the process which comprises chlorinating the material at a temperature sufficiently high to volatilize iron chloride and titanium tetrachloride to form a vapor mixture containing a large quantity of both iron and titanium chlorides, initially condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system and separately condensing a further quantity of titanium chloride from the vapor mixture.

2. In the chlorination of a titanium bearing material which contains a quantity of iron of such magnitude that upon chlorination of said material, the amount of iron chloride formed is such as to cause plugging of the condenser system and at least 10 percent of titanium, the process which comprises chlorinating the material at a temperature sufficiently high to volatilize iron chloride and titanium tetrachloride to form a vapor mixture containing a large quantity of both iron and titanium chlorides, initially condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system and heating the resulting condensed mixture in the presence of a gaseous diluent at a low temperature to vaporize titanium tetrachloride from the iron chloride.

3. In the chlorination of a titanium bearing material which contains a quantity of iron of such magnitude that upon chlorination of said material, the amount of iron chloride formed is such as to cause plugging of the condenser system and at least 10 percent of titanium, the process which comprises chlorinating the material at a temperature sufficiently high to volatilize iron chloride and titanium tetrachloride to form a vapor mixture containing a large quantity of both iron and titanium chlorides, initially condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system and heating the resulting condensed mixture in the presence of a portion of the uncondensed vapor to volatilize titanium tetrachloride.

4. In the chlorination of a titanium bearing material which contains a quantity of iron of such magnitude that upon chlorination of said material, the amount of iron chloride formed is such as to cause plugging of the condenser system and at least 10 percent of titanium, the process which comprises chlorinating the material at a temperature sufficiently high to volatilize iron chloride and titanium chloride to form a vapor mixture thereof containing a large quantity of both iron and titanium chlorides, initially condensing the major portion of the iron chloride from the vapor mixture together with a quantity of titanium tetrachloride in an amount sufficient to insure the elimination of the major portion of the condensed iron chloride and thus the minimize the tendency toward plugging of the system and heating the resulting condensed mixture in the presence of gaseous chlorine at a low temperature to vaporize the titanium tetrachloride from the iron chloride.

5. In the chlorination of a titanium bearing material containing in excess of 10 percent of titanium and in excess of 10 percent of iron, the process which comprises chlorinating the material at a temperature sufficiently high to volatilize iron chloride and titnium tetrachloride to form a vapor mixture thereof, condensing the major portion of the iron chloride from the vapor mixture together with at least 15 percent of titanium tetrachloride whereby the elimination of the major portion of the condensed iron chloride from the vapor mixture is insured and the tendency toward plugging of the system is minimized, and heating the resulting condensed mixture in the presence of a diluent at a low temperature to vaporize titanium tetrachloride from the iron chloride.

6. In the chlorination of ilmenite ore the process which comprises chlorinating the ore at a temperature sufficiently high to volatilize iron chloride and titanium tetrachloride to form a vapor mixture containing a large quantity of both iron and titanium chlorides, condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system and separately condensing a further quantity of titanium chloride from the vapor mixture.

7. In the chlorination of ilmenite ore the process which comprises chlorinating the ore at a temperature sufficiently high to volatilize iron chloride and titanium tetrachloride to form a vapor mixture containing a large quantity of both iron and titanium chlorides, condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system, and heating the resulting condensed mixture in the presence of a portion of uncondensed vapor to volatilize titanium tetrachloride.

8. In the chlorination of a titanium oxide bearing material containing in excess of 10 percent of titanium and in excess of 10 percent of iron, the process which comprises chlorinating the material at a temperature sufficiently high to volatilize iron chloride and titanium tetrachloride to form a vapor mixture thereof, condensing the major portion of the iron chloride from the vapor mixture together with at least 15 percent of the titanium tetrachloride whereby the elimination of the major portion of the condensed iron chloride from the vapor mixture is insured and the tendency toward plugging of the system is minimized, and heating the resulting condensed mixture in the presence of a portion of the uncondensed vapor to volatilize titanium tetrachloride.

9. A method of separating iron and titanium chlorides from a vapor mixture containing substantial quantities of both chlorides which comprises condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system, and subsequently separately condensing the remainder of the titanium tetrachloride.

10. A method of separating iron and titanium chlorides from a vapor mixture containing substantial quantities of both chlorides which comprises introducing the vapor mixture into a condensing system, condensing the major portion of the iron chloride from the vapor mixture together with a quantity of titanium tetrachloride in an amount sufficient to insure the elimination of the major portion of the condensed iron chloride from the vapor mixture in one portion of the system, moving the condensed mixture of iron and titanium chloride to a zone of higher temperature within the condenser system, and heating the condensed mixture to vaporize the titanium tetrachloride from the iron chloride.

11. A method of separating iron and titanium chlorides from a vapor mixture containing substantial quantities of both chlorides which comprises condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system, spraying the residual vapor mixture with liquid titanium tetrachloride to assist elimination of solid iron chloride therefrom and heating the condensed mixture to vaporize the titanium tetrachloride from the iron chloride.

12. A method of separating titanium and iron chlorides from a vapor mixture containing substantial quantities of both chlorides which comprises condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system, spraying the residual vapor mixture and the condensed solids with liquid titanium tetrachloride to assist elimination of solid iron chloride therefrom and heating the condensed mixture to vaporize the titanium tetrachloride from the iron chloride.

13. A method of separating iron and titanium chlorides from a vapor mixture containing substantial quantities of both chlorides which comprises condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system, spraying the residual vapor mixture with liquid halide to assist elimination of solid iron chloride therefrom and heating the condensed mixture to vaporize the titanium tetrachloride from the iron chloride.

14. A method of separating titanium and iron chlorides from a vapor mixture containing substantial quantities of both chlorides which comprises condensing the major portion of the iron chloride from the vapor mixture together with a quantity of titanium tetrachloride in an amount sufficient to insure the elimination of the major portion of the condensed iron chloride from the vapor mixture and thus to minimize the tendency toward plugging of the system, spraying the residual vapor mixture and the condensed solids with liquid halide to assist elimination of solid iron chloride therefrom and heating the condensed mixture to vaporize the titanium tetrachloride from the iron chloride.

15. A method of separating iron and titanium chlorides from a vapor mixture thereof which comprises introducing said mixture into one portion of a condenser, condensing the major portion of the iron chloride from the vapor mixture together with at least a portion of titanium chloride, moving the condensate from the point of condensation to a zone of higher temperature within said condenser and heating said zone to vaporize titanium chloride.

16. A method of separating iron and titanium chlorides from a vapor mixture thereof which comprises introducing said mixture into one portion of a condenser, condensing the major portion of the iron chloride from the vapor mixture together with at least a portion of titanium chloride, moving the condensate from the point of condensation to a zone of higher temperature within said condenser, heating said zone to vaporize titanium chloride and passing the uncondensed portion of the mixture over the condensate to assist in such vaporization.

17. The process of claim 16 wherein the condensate and the uncondensed vapors are in concurrent contact.

18. The process of claim 16 wherein the vapors after passing in contact with the condensate are sprayed with a liquid halide.

IRVING E. MUSKAT.
ROBERT H. TAYLOR.